US005165156A

United States Patent [19]

Shultz

[11] Patent Number: 5,165,156

[45] Date of Patent: Nov. 24, 1992

[54] CLUTCH HOUSING ASSEMBLY AND PLANETARY GEAR ASSEMBLY TOOL

[76] Inventor: William E. Shultz, 239 N. Main St., Lombard, Ill. 60148

[21] Appl. No.: 529,465

[22] Filed: May 29, 1990

[51] Int. Cl.[5] .............................................. B23P 19/04

[52] U.S. Cl. ........................................ 29/275; 29/258; 29/259; 29/261; 29/263

[58] Field of Search ................. 29/256, 258, 259, 261, 29/262, 263, 275; 269/67

[56] References Cited

U.S. PATENT DOCUMENTS

| | | | |
|---|---|---|---|
| 4,057,886 | 11/1977 | Brass | 29/235 |
| 4,443,922 | 4/1984 | Deland | 29/259 |
| 4,514,890 | 5/1985 | Stewart | 29/275 |

*Primary Examiner*—J. J. Swann
*Attorney, Agent, or Firm*—Marshall, O'Toole, Gerstein, Murray & Bicknell

[57] ABSTRACT

A tool for installing and removing a clutch drum piston assembly from a planetary gear assembly and for installing and removing the planetary gear assembly within an automobile automatic transmission includes a sliding hammer arrangement and an adjustable spindle adapted to be used with clutch drum assemblies of various diameter central apertures. The adjustable spindle is formed form a plurality of elongated arcuate members radially disposed about a cylindrical member intermediate the ends of the arcuate members defining a fulcrum. An adjustment collar having a tapered interior surface is disposed about one end of the elongated arcuate members. As the adjustment collar is moved axially toward the other end of the assembly, the tapered inner surface causes the arcuate members to pivot radially outwardly about the fulcrum. A shaft is connected to the disk and extends outwardly from the collar. The outwardly extending portion of the shaft serves as a guide for a sliding hammer. The interior surface of the adjustment collar is provided with one or more cam followers which cooperate with cam surfaces integrally formed on the ends of the arcuate members. The cam surfaces allow the adjustment collar to be axially fixed with respect to the arcuate members.

15 Claims, 3 Drawing Sheets

CLUTCH HOUSING ASSEMBLY AND PLANETARY GEAR ASSEMBLY TOOL

FIELD OF THE INVENTION

The present invention relates to a clutch drum assembly tool with an adjustable spindle for installing and extracting a clutch drum assembly and/or a planetary gear assembly from a part of an automobile automatic transmission.

DESCRIPTION OF THE PRIOR ART

Oftentimes it is necessary to remove a clutch housing assembly from an automobile automatic transmission for repair or replacement. The clutch housing assembly includes a plurality of clutch plates, used to cause various portions of the planetary gear arrangement to become engaged or disengaged to provide for different gear ratios and to allow the direction of rotation to be reversed.

In general, such clutch housing assemblies are provided with a predetermined diameter central aperture The diameter of the central aperture in the clutch housing is not standard among the various automobile automatic transmission manufacturers. Available tools for facilitating removal of the clutch housing assembly generally include means for grasping the clutch drum assembly via the central aperture and a sliding hammer arrangement. For example, U.S. Pat. No. 4,443,922 to Deland illustrates such a tool. In Deland, means for gripping the central aperture of the clutch housing includes a pair of concentric cylindrical members adapted for telescopic movement with respect to each other. The outer cylindrical member is provided with a plurality of axially extending resilient fingers. Each of the axially extending fingers is provided with an inwardly facing cam surface at one end. Thus, once the extending fingers are inserted into the central aperture in the clutch housing assembly, the inner cylinder is moved axially toward the fingers which allows the inner cylindrical member to engage the inwardly facing cam surfaces and spread the fingers outwardly in the aperture to securely grip the clutch housing. The opposite end of the tool is provided with a sliding hammer arrangement to facilitate the removal of the clutch housing assembly.

The problem with such tools is they are not adjustable and are designed for a central aperture of a predetermined diameter for a particular manufacturer's automatic transmission. Further, it is necessary to remove a central transmission shaft so that the tool can be operatively inserted in contact with the clutch housing assembly. Accordingly, transmission repair shops that service a variety of automatic transmissions must purchase a variety of tools for servicing different manufacturer's automatic transmissions.

SUMMARY OF THE INVENTION

It is an object of the present invention to provide a tool for facilitating installation and removal of a clutch housing assembly from a planetary gear arrangement and the installation and removal of the planetary gear assembly in an automobile automatic transmission which solves the problems associated with the prior art.

It is yet another object of the present invention to provide a tool for facilitating installation and removal of clutch housing assemblies and/or planetary gear assemblies having various diameter central apertures from an automatic transmission.

Another object of the present invention is to provide a tool for facilitating installation and removal of clutch housing assemblies and planetary gear assemblies that is operational without removal of a central shaft extending from the clutch housing assembly.

Briefly, the present invention relates to a tool for installing and removing a clutch housing assembly and/or a planetary gear assembly from within an automobile automatic transmission which includes a sliding hammer arrangement and an adjustable spindle, adapted to be used with clutch drum assemblies of various diameter central apertures. A tubular central shaft disposed above the adjustable spindle telescopes over the central transmission shaft so that the clutch drum assembly can be removed and installed without removal of the central transmission shaft. The adjustable spindle is formed from a plurality of elongated arcuate members radially disposed about a disk intermediate the ends of the arcuate members defining a fulcrum. An adjustment collar having a tapered interior surface is disposed about one end of the elongated arcuate members. As the adjustment collar is moved axially towards the opposite end of the assembly, the tapered inner surface causes the arcuate members to pivot radially outwardly about the fulcrum. A shaft is connected to the disk and extends outwardly from the collar. The outwardly extending portion of the shaft serves as a guide for a sliding hammer. The interior surface of the adjustment collar is provided with one or more cam followers which cooperate with cam surfaces integrally formed on the ends of the arcuate members. The cam surfaces allow the adjustment collar to be axially fixed with respect to the arcuate members. The adjustment collar thus provides a means for varying the radial spacing and hence the overall diameter of the circle defined by the arcuate members forming an adjustable spindle assembly.

DESCRIPTION OF THE DRAWINGS

These and other objects and advantages of the present invention will be apparent from the following description and accompanying drawings, wherein.

Figure 2:
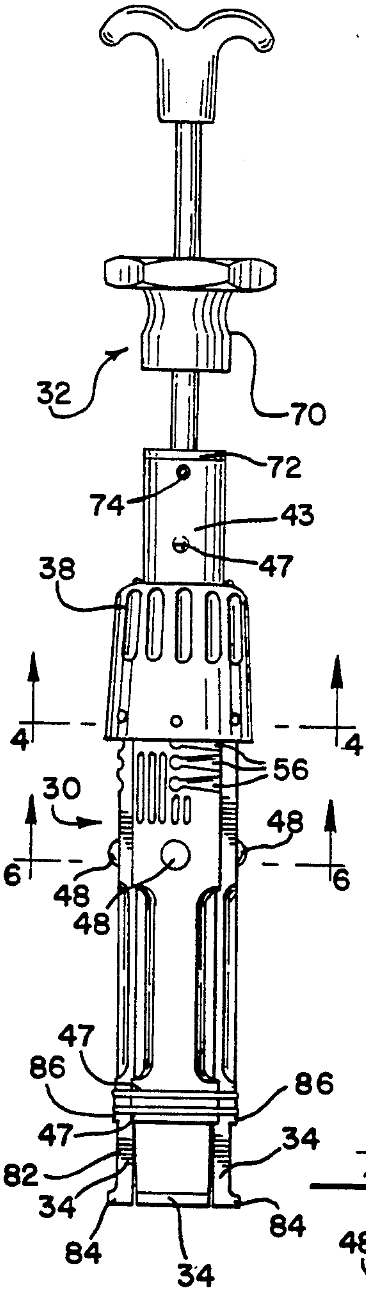
FIG. 2 is an elevational view of a tool in a non-expanded position for facilitating installation and removal of a clutch housing assembly and/or a planetary gear assembly in an automobile automatic transmission in accordance with the present invention.
Figure 3:
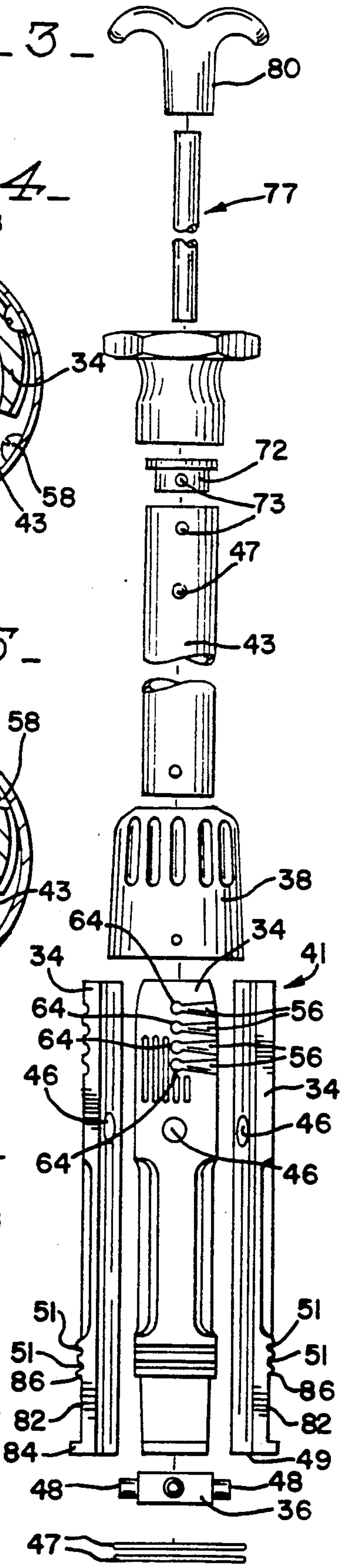
FIG. 3 is an exploded, elevational view of the tool illustrated in FIG. 2.
Figure 7:
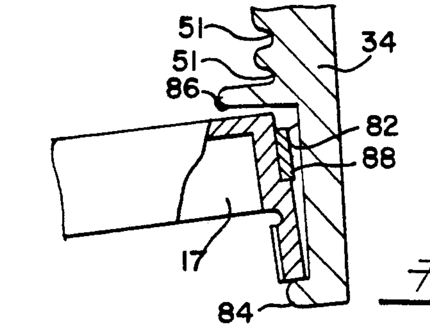
Figure 8:
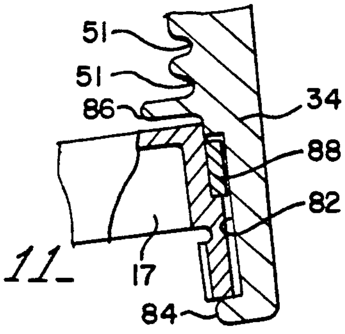
Figure 11:
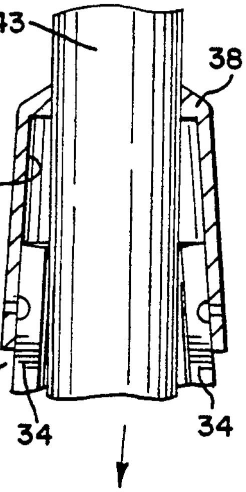
Figure 10:
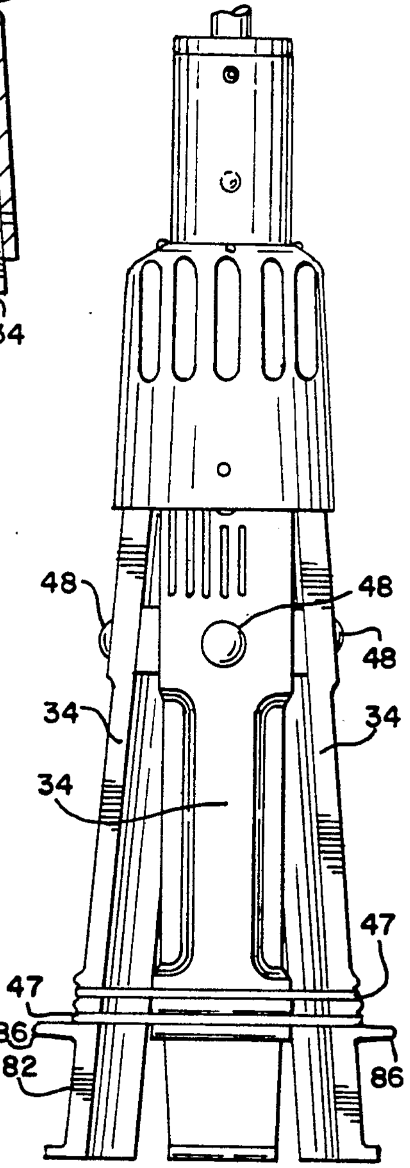
Figure 9:
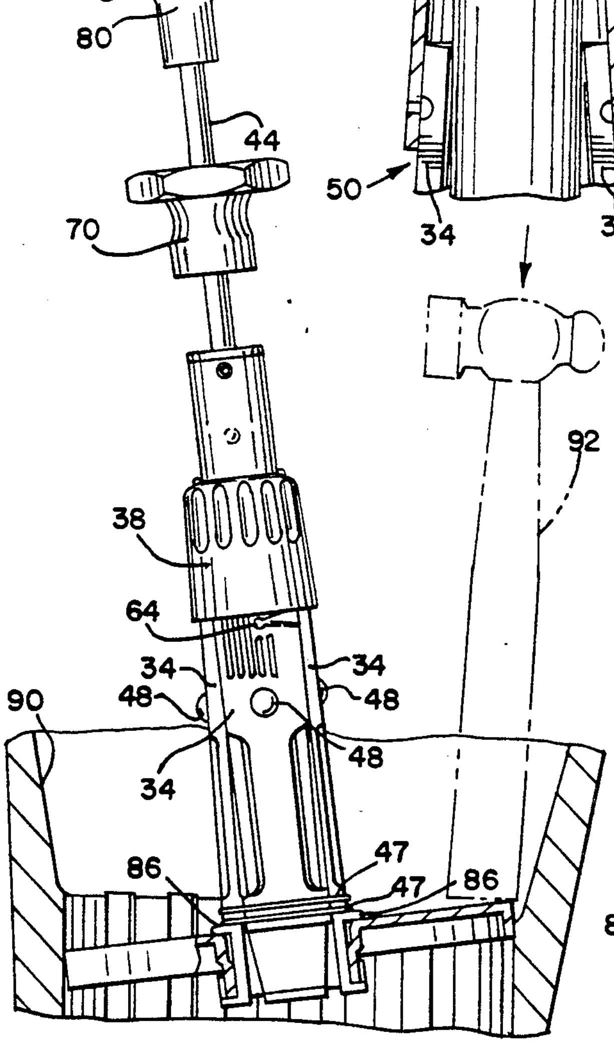

PIG. 6 is a plan sectional view along line 6—6 of FIG. 2;

FIG. 7 is a partial sectional view of the tool inserted into the central aperture of a central clutch housing in a non-expanded position illustrating an annular bushing;

FIG. 8 is similar to FIG. 7, illustrating the tool in an expanded position;

FIG. 9 is a cutaway view of a portion of a transmission housing illustrating the tool;

FIG. 10 is similar to FIG. 2, illustrating the adjustable spindle in an expanded mode; and FIG. 11 is a sectional view of the adjustment collar and a portion of the elongated arcuate members in accordance with the present invention.

DETAILED DESCRIPTION

Figures 1, 1A, 1B:
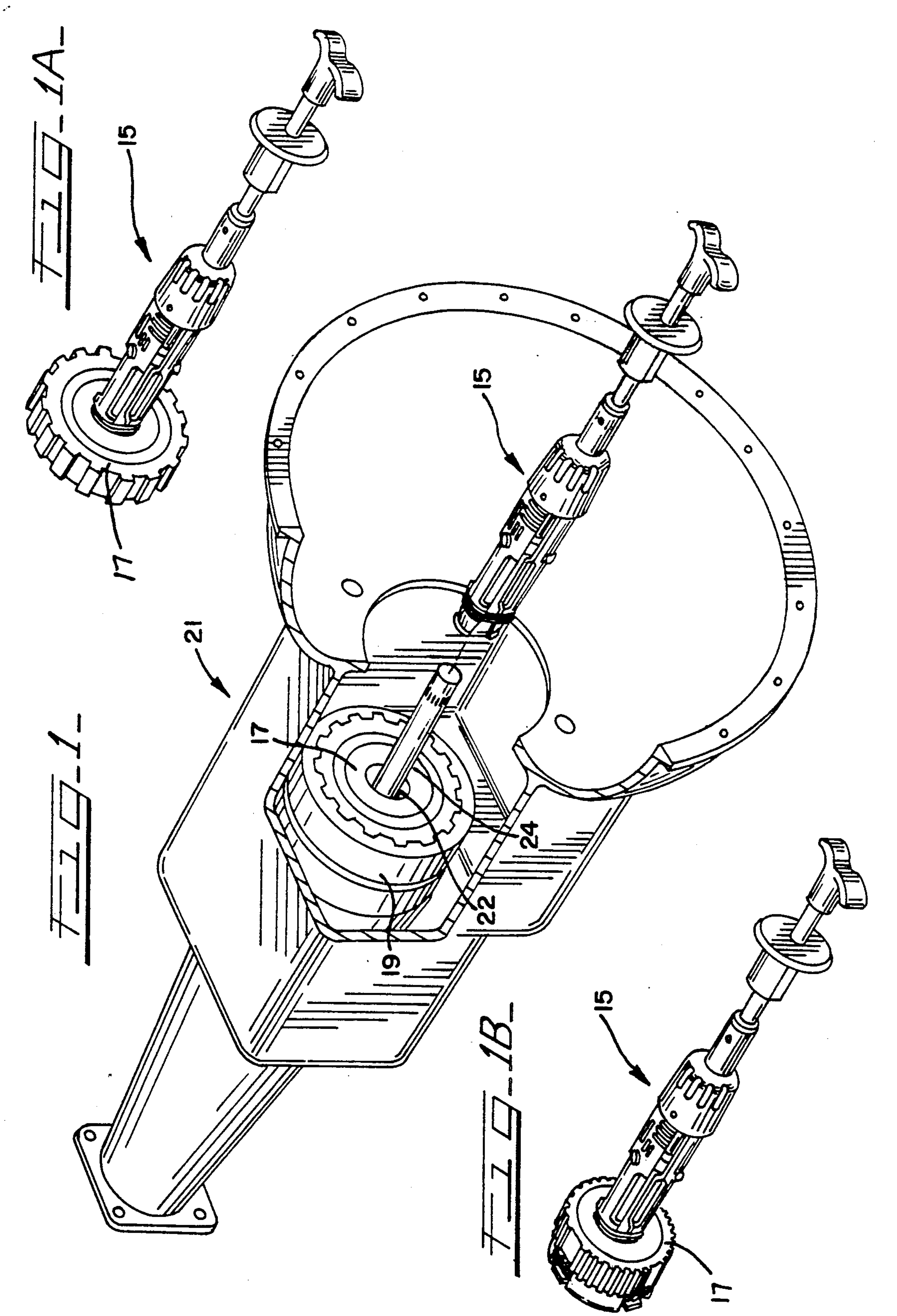
FIG. 1 is a cutaway perspective view of an automobile automatic transmission illustrating a clutch housing assembly, a planetary gear assembly and tool in accordance with the present invention.
FIGS. 1A and 1B are perspective views of the tool used to remove and install a planetary gear assembly.

The tool in accordance with the present invention is generally identified with the reference numeral 15. The tool 15 facilitates installation and removal of a clutch housing assembly 17 from a planetary gear assembly 19, and installation and removal of the planetary gear assembly 19, in an automobile automatic transmission 21. As illustrated in FIG. 1, the tool 15 is inserted into a central aperture 22 in the clutch housing assembly 17. The clutch housing assembly 17 is concentric with the planetary gear assembly 19 about a common elongate transmission shaft 24.

The tool 15 includes an adjustable spindle subassembly 30 and a sliding hammer subassembly 32. The adjustable spindle subassembly 30 allows the tool 15 to be used with various clutch drum assemblies 17 having various diameter central apertures 22. As shown and illustrated, the adjustable spindle subassembly 30 is illustrated with four detent adjustment positions for four different diameter central apertures 22. However, it should be understood by those of ordinary skill in the art, that the principles of the invention are equally applicable to tools without detent adjustment positions and to tools with more or less than four detent adjustment positions.

The adjustable spindle subassembly 30 includes a plurality, for example three, elongate arcuate members 34. The elongate arcuate members 34 are spaced about a disk 36 in a circular arrangement. The disk 36 acts as a fulcrum for the elongate arcuate members 34. An adjustment collar 38 having tapered interior sidewall 40 is disposed adjacent one end, generally designated 41, of the elongate arcuate members 34. The adjustment collar 38 includes a central aperture 42 for receiving a central tubular transmission shaft-receiving member 43 that is secured at one end to the disk 36, and operatively connected on its upper end to a shaft 44. The tubular member 43 includes stop bumps 37 for contact against an upper surface of collar 38 to limit the upward movement of collar 38 with respect to the tubular member 43.

The disk 36 is formed as a generally cylindrical member having a centrally disposed aperture for receiving a press-fitted end of the tubular transmission shaft-receiving member 43. Pins or other securing means 45 aid to secure the member 43 with respect to the disk 36 in addition to being press fitted together. The transmission shaft-receiving member 43 is received at an upper portion thereof through a centrally disposed aperture in the adjustment collar 38.

The elongate arcuate members are resiliently held in place by one or more elastomeric O-rings 47 disposed adjacent an end 49. The 0-rings 47 are received in arcuate grooves 51 formed adjacent the ends 49 of the elongate members 34.

Each elongate arcuate member 34 is provided with a transverse aperture 46 intermediate the ends 41 and 49. The transverse apertures 46 are for receiving studs 48 extending radially outwardly from the disk 36. The studs 48 are generally equally spaced about the periphery of the disk 36. This arrangement allows the elongate arcuate members 34 to be captured with respect to the disk 36 to prevent both radial and axial movement with respect to the disk 36. However, the arrangement does allow the elongate arcuate members 34 to pivot radially inwardly and radially outwardly.

The pivotal movement of the elongated arcuate members 34 is caused by axial movement of the adjustment collar 38. More specifically, the adjustment collar 38 is formed as a cup-shaped member having tapered interior sidewall 40 such that the largest diameter is formed at the mouth 50 of the collar 38. In the normal position as shown in FIG. 2, one end 41 of each of the elongated arcuate members 34 is disposed adjacent the mouth 50. As the adjustment collar 38 is moved axially in a direction toward the other end 49 of the elongate arcuate members 34, this action forces the elongate arcuate members 34 to pivot about the fulcrum defined by the disk 36, such that the other ends 49 of the elongate arcuate member 34 are in an expanded position as shown in FIG. 10. The amount of pivotal movement of the elongate members 34 is controlled by the amount of axial movement of the adjustment collar 38.

Figure 4:
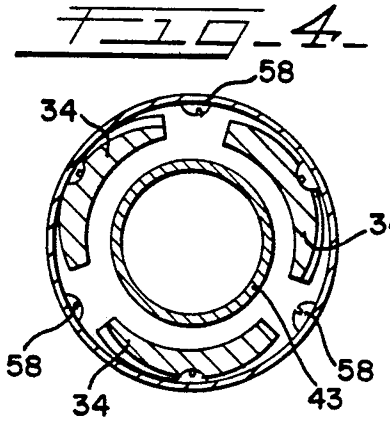
FIG. 4 is a plan sectional view along line 4—4 of FIG. 2.
Figure 5:
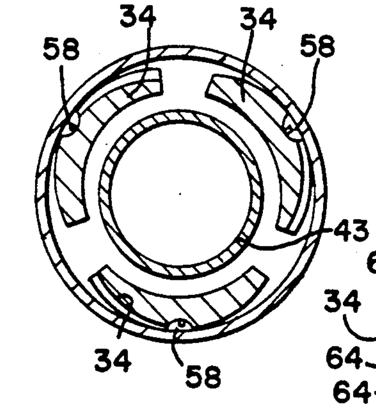
FIG. 5 is similar to FIG. 4, but illustrates the cam followers in one of the cam positions.
Figure 6:
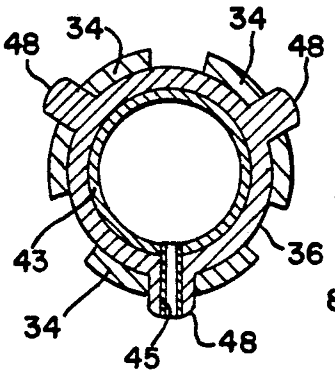

An important aspect of the invention relates to the cam and cam followers provided on the elongate arcuate members 34 and the adjustment collar 38 which define a plurality of detent adjustment positions. More specifically, each elongate arcuate member 34 is provided with a plurality of cam surfaces 56, for example four. These cam surfaces 56 are formed as generally parallel radial grooves in the end adjacent the end 41 of the elongate arcuate members 34. The cam surfaces 56 are axially aligned on all of the elongated arcuate members 34 and cooperate with cam followers 58 formed as, for example, pins provided on the adjustment collar 38 adjacent the mouth 50. Each cam follower 58 cooperates with a cam surface 56 on each of the elongate arcuate members 34. As best shown in FIG. 4, in a normal position the cam followers 58 are disposed in radial spaces between each of the elongate arcuate members 34. As the adjustment collar 38 is moved axially in a direction toward the end 49 of the elongate arcuate members 34, the elongate arcuate members 34 expand. In order to place the elongated arcuate members 34 in one of several detent adjustment positions, the adjustment collar 38 is rotated in a clockwise direction. This action causes the cam followers 58 to ride along the cam surfaces 56. Each cam surface 56 is provided with an indentation 64 at one end which defines a detent adjustment position. These indentations 64 are complementary to the shape of the cam followers 58. Since the indentations 64 are formed deeper than the cam surfaces 56, the cam followers 58 are captured in place with respect to the elongate arcuate members 34, thus fixing their relative radial position.

In order to change to a different range, the process is simply reversed and repeated. More specifically, the adjustment collar 38 is rotated in a counterclockwise direction until the cam followers 58 are disposed in the radial spaces defined between the elongate arcuate members 34, as shown in FIG. 4. This action will then allow the adjustment collar 38 to be moved in an axial direction to allow the tool 15, for example, to be removed from the clutch housing assembly 17.

A sliding hammer subassembly 32 facilitates installation and removal of the clutch housing assembly 17 and/or the planetary gear assembly 19 by allowing axially inward and axially outward forces to be applied to the spindle subassembly 30. The sliding hammer assembly 32 includes a mushroom-shaped hammer 70 with a central aperture (not shown) received about the shaft 44 for sliding movement. Once the adjustable spindle subassembly 30 is inserted into the central aperture 22, engagement of the hammer 70 against a collar 72 forming an upper end of tubular transmission shaft-receiving member 43 applies axial forces to the adjustable spindle subassembly 30 to allow the clutch drum assembly 17 to be installed or removed.

The application of force to the upper end off tubular member 43 and collar 72 prevents the axial force from the hammer 70 from being directly applied to the adjustment collar 38. The tubular member 43 and collar 72 are each provided with a threaded radial aperture 73 for receiving a set screw 74 to allow the collar 72 to be secured to the tubular member 43 and shaft 44.

In order to facilitate handling of the tool, a handle 80 is provided. The handle 80 contains a centrally disposed threaded aperture to allow the handle 80 to be threaded onto the end 77 of the shaft 44. The shape of the handle 80 is not critical to the practice of the invention.

As shown in FIGS. 2,3,7,8,9 and 10, the ends 49 of the elongate arcuate members 34 are formed with an arcuate groove 82 defining a lip portion 84 and a shoulder 86. Groove 82 defines a notched or cut-out portion that defines an upper surface of lip 84 and a lower surface of shoulder 86. While the arcuate surface 82 thus defined is smooth, it is a cut-out portion or groove. The axial distance between the lip 84 and the shoulder 86 should be such to allow the clutch housing assembly 17 to be captured therebetween. The shoulder 86 prevents the tool 15 from being dropped too far into the clutch housing assembly 17, so that initial alignment of the tool is simpler and less time-comsuming. The tool 15 is useful for removing the clutch housing assembly 17 from the planetary gear assembly 19 with or without an annular bushing 88 disposed in the central aperture 24 in the clutch drum assembly 17. Prior art tools have required grasping of the bushing 88 for removal of the clutch housing assembly 17. Similarly, the planetary gear assembly 19 can be removed, as shown in FIGS. 1A and 1B. FIG. 7 illustrates the position of a portion of an elongated arcuate member 4 with respect to the clutch housing assembly 17 and the bushing 88.

Once the adjustable spindle subassembly 30 is inserted into the central aperture 22 of the clutch housing assembly 17 and adjusted to the proper range, with the arcuate members 34 (expanded to a diameter that fits the clutch housing being installed or removed) axial forces from the sliding hammer 70 will allow the clutch housing assembly 17 to either be installed or removed from the planetary gear assembly 17. Similarly, the planetary gear assembly 17 can be removed with the tool 15 after removal of the clutch drum piston assembly and installed prior to the installation of the clutch drum piston assembly. Occasionally, the clutch housing assembly 17 may become cocked with respect to a planetary gear assembly housing 90. As best shown in FIG. 9, in order to avoid scoring the planetary gear housing 90, often made of cast aluminum, the butt end of a hammer 92 can be used to straighten out the clutch housing assembly 17 with respect to the planetary gear assembly housing 90 to allow the clutch housing assembly 17 to be removed straight.

Obviously, many modifications and variations of the invention as hereinbefore set forth can be made without departing from the spirit and scope thereof and, therefore, only such limitations should be imposed as are indicated by the appended claims.

What is claimed and sought to be secured by Letters Patent is:

1. A tool for installing and removing a plurality of clutch housing assemblies having central apertures of different diameters form a planetary gear arrangement in an automobile automatic transmission comprising:

a spindle subassembly having a radially expandable member for removably engaging the clutch housing after positioning behind said clutch housing after being received in said central aperture;

adjustment means for the spindle assembly for movement between a normal position and a plurality of expanded positions to a desired diameter of the central aperture of one of the clutch housing assemblies to be removed; and detent means operatively connected to said radially expandable member for providing a number of detent positions for adjusting the radial expansion of said expandable member to the desired diameter.

2. A tool as recited in claim 1, further including force transmitting means for transmitting forces to said spindle assembly.

3. A tool as recited in claim 2, wherein said forces are axial forces with respect to said clutch housing assembly.

4. A tool as recited in claim 2, wherein said force transmitting means includes a hammer member and an anvil member operatively coupled to said spindle subassembly.

5. A tool as recited in claim 1, wherein said spindle subassembly includes a plurality of elongated arcuate members disposed about and in operable contact with a disk, said disk disposed intermediate ends of the elongated arcuate members and to define a fulcrum at contact of the arcuate member against the disk for pivoting of said elongated arcuate members.

6. A tool as recited in claim 5, further including capture means for capturing said elongated members for preventing axial movement with respect to said disk.

7. A tool as recited in claim 5, wherein said capture means includes a plurality of studs extending radially outwardly from said disk, received in said transverse apertures in said elongated arcuate members.

8. A tool as recited in claim 5, further including biasing means disposed adjacent an end of said arcuate members to bias free ends of said arcuate members radially inward with respect to said disk for returning said arcuate members to an unexpanded position.

9. A tool as recited in claim 8, wherein said adjustment collar is formed as a cup-like member open at one end defining an arcuate member-receiving mouth, said collar having a tapered inner surface, defining a larger diameter circular cross-section at one end of said collar and a smaller diameter circular cross-section at the other end of said collar.

10. A tool as recited in claim 9, wherein said collar is formed with the larger diameter circular cross-section at said mouth.

11. A tool as recited in claim 1, wherein said detent means includes a cam and cam follower.

12. A tool as recited in claim 1, wherein said expandable member is sufficiently elongated to receive a central transmission shaft during installation and removal of the clutch drum assembly.

13. A tool for installing and removing clutch housing assemblies and planetary gear assemblies having a central aperture of various predetermined diameters in an automobile transmission comprising:

a disk;

a plurality of elongated arcuate members disposed about said disk, said disk defining a fulcrum for each arcuate member at contact of each arcuate member against the disk;

an adjustment collar formed as a cup-shaped member disposed adjacent one end of said elongated arcuate members having a tapered inner surface which cooperates with said arcuate member ends of said elongated arcuate members such that movement of said collar in an axial direction forces said arcuate member ends toward each other by sliding along the tapered inner surface of said collar, thereby causing said elongated arcuate members to pivot about said fulcrum from a normal position to a plurality of expanded positions for providing a predetermined fixed number of expanded positions; and detent means operatively connected to said elongate arcuate members for providing a number of detent positions for adjusting the expansion of said arcuate members to the desired diameter.

14. A tool as recited in claim 13, wherein said detent means includes a plurality of cam surfaces formed on said elongated arcuate members and a plurality of cam followers formed on said adjustment collar.

15. A tool as recited in claim 14, wherein said cam followers are formed from bullet pins.

* * * * *

UNITED STATES PATENT AND TRADEMARK OFFICE

CERTIFICATE OF CORRECTION

PATENT NO. : 5,165,156

DATED : November 24, 1992

INVENTOR(S) : WILLIAM E. SHULTZ

It is certified that error appears in the above-indentified patent and that said Letters Patent is hereby corrected as shown below:

Column 2, line 62, delete "Pig." and substitute therefor -- Fig. --;

Column 5, line 44, after "member" delete "4" and substitute therefor -- 34 --.

Signed and Sealed this

Thirteenth Day of September, 1994

Attest:

BRUCE LEHMAN

*Attesting Officer*

*Commissioner of Patents and Trademarks*